United States Patent [19]

McCandless

[11] Patent Number: 4,500,808
[45] Date of Patent: Feb. 19, 1985

[54] MULTIBEAM ELECTRON GUN WITH COMPOSITE ELECTRODE HAVING PLURALITY OF SEPARATE METAL PLATES

[75] Inventor: Harry E. McCandless, Lancaster, Pa.

[73] Assignee: RCA Corporation, New York, N.Y.

[21] Appl. No.: 364,688

[22] Filed: Apr. 2, 1982

[51] Int. Cl.³ .................. H01J 29/46; H01J 29/50
[52] U.S. Cl. ..................................... 313/409; 313/447
[58] Field of Search ............... 313/409, 413, 414, 417, 313/446, 447, 456, 457; 445/34, 36

[56] References Cited

U.S. PATENT DOCUMENTS

| | | | |
|---|---|---|---|
| 3,524,235 | 8/1970 | Burdick | 445/34 |
| 3,777,210 | 12/1973 | Spalding | 313/256 |
| 3,906,279 | 9/1975 | Linssen | 313/409 |
| 4,234,814 | 11/1980 | Chen et al. | 313/414 |
| 4,298,818 | 11/1981 | McCandless | 313/417 |
| 4,366,414 | 12/1982 | Hatayama et al. | 313/409 |
| 4,443,736 | 4/1984 | Chen | 313/444 X |

Primary Examiner—Palmer Demeo
Assistant Examiner—Sandra L. O'Shea
Attorney, Agent, or Firm—E. M. Whitacre; D. H. Irlbeck; L. Greenspan

[57] ABSTRACT

A multibeam electron gun comprising two spaced successive electrodes individually held in position from a common support. One electrode comprises a single metal first plate having at least three electron-beam-defining first apertures therein. The other electrode is a composite structure comprising (a) a single metal second plate having a window therein opposite each of said first apertures and (b) a separate metal third plate attached to said second plate closing each of the windows. The third plate has a single electron-beam-defining second aperture therein separately aligned with one of the first apertures.

4 Claims, 5 Drawing Figures

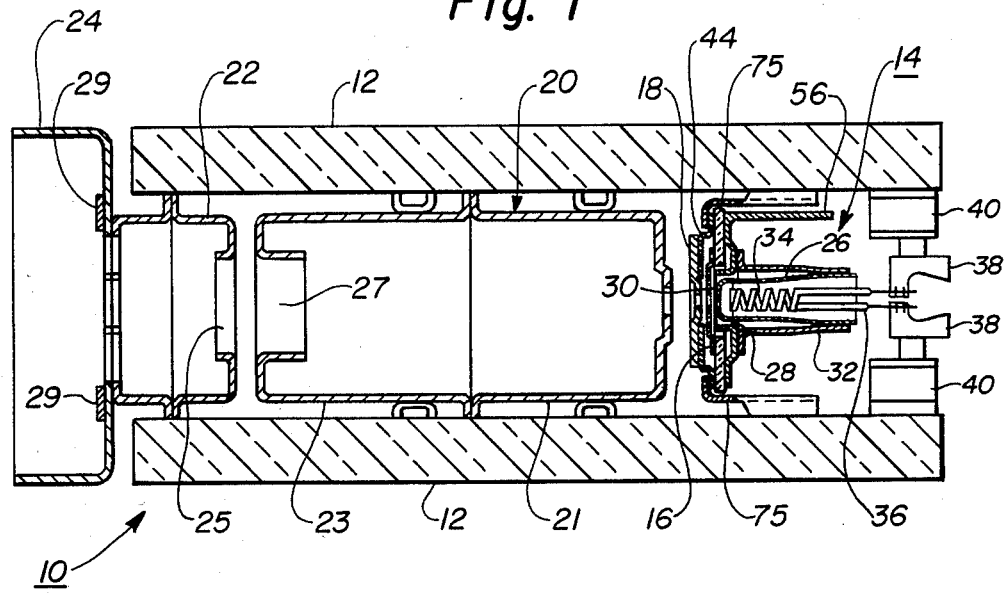
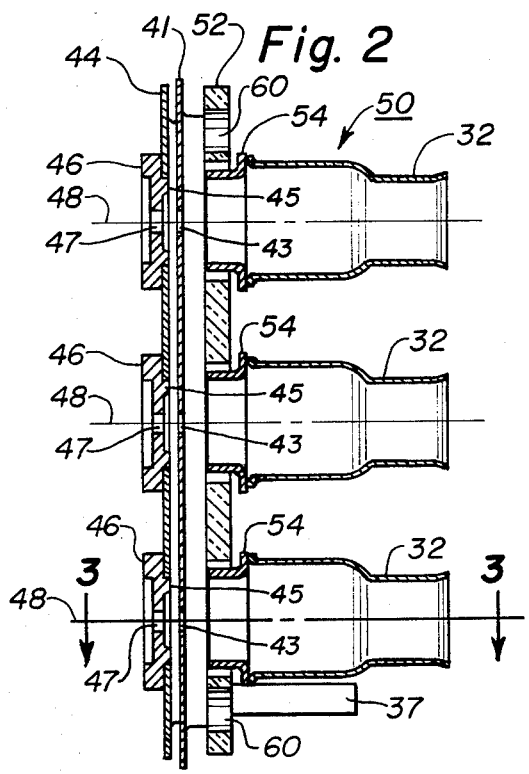
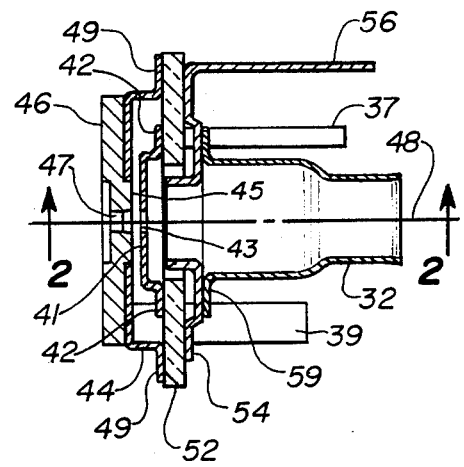

MULTIBEAM ELECTRON GUN WITH COMPOSITE ELECTRODE HAVING PLURALITY OF SEPARATE METAL PLATES

BACKGROUND OF THE INVENTION

This invention relates to a novel multibeam electron gun and to a novel method for assembling that gun. The novel gun and novel method can provide better alignment of successive grid apertures as compared with a prior gun design.

My U.S. Pat. No. 4,298,818 issued Nov. 3, 1981 describes an electron gun for use in a multibeam cathode-ray tube. That gun includes at least two spaced successive electrodes held in position from a common support. Each electrode comprises a single metal plate having three beam-defining apertures therein, which apertures are so aligned as to permit the passage of three electron beams. The sizes and shapes of the electron beams are determined in part by the sizes, shapes and alignments of the apertures. Apertures that are misaligned by as little as 0.125 mm (0.5 mil) can cause distorted beam shapes and degrade the performance of the tube.

Where there are three or more beam-defining apertures in each of two spaced single-plate electrodes, it is the practice to align the apertures of the electrodes, either optically or mechanically, from two apertures of each of the electrodes. While the positions of the apertures in each electrode are precisely prescribed, nevertheless there are necessary manufacturing tolerances present in the fabrication of these electrodes. Manufacturing tolerances allow the sizes and positions of the apertures in each electrode to deviate slightly from the bogie or designed values. Typical manufacturing tolerances allow variations in aperture sizes up to about ±0.008 mm (0.3 mil) and in spacings up to about ±0.0125 mm (0.5 mil). As a result, the apertures of one electrode usually are misaligned with respect to the corresponding apertures in the other electrode even though great care is taken to achieve the designed structure.

SUMMARY OF THE INVENTION

The novel gun comprises, as in prior guns, at least two spaced successive electrodes individually held in position from a common support. Each of the electrodes has at least three beam-defining apertures aligned along common axes with apertures in the other electrode. One of the electrodes comprises a single metal first plate having a plurality of precisely-spaced beam-defining fist apertures. Unlike prior guns, the other electrode is a composite structure comprising a common metal second plate having a plurality of windows opposite the first apertures. Each window is closed by a separate third plate having a single beam-defining second aperture therein separately aligned to one of the first apertures.

The novel method is similar to the prior method except that, instead of attaching a single second-plate apertured electrode to the support, a windowed second plate is attached to the support. Then, a separate third plate having a single beam-defining second aperture therein is positioned over each window, the second aperture is aligned to its associated first aperture in the first plate, and the third plate is fixed to the second plate.

BRIEF DESCRIPTION OF THE DRAWING

FIG. 1 is a partially cut-away, side elevational view of a preferred embodiment of the novel gun.

FIGS. 2 and 3 are front and side sectional elevational views respectively of the cathode-grid subassembly comprising the gun shown in FIG. 1.

DETAILED DESCRIPTION OF THE PREFERRED EMBODIMENT

Figure 4:
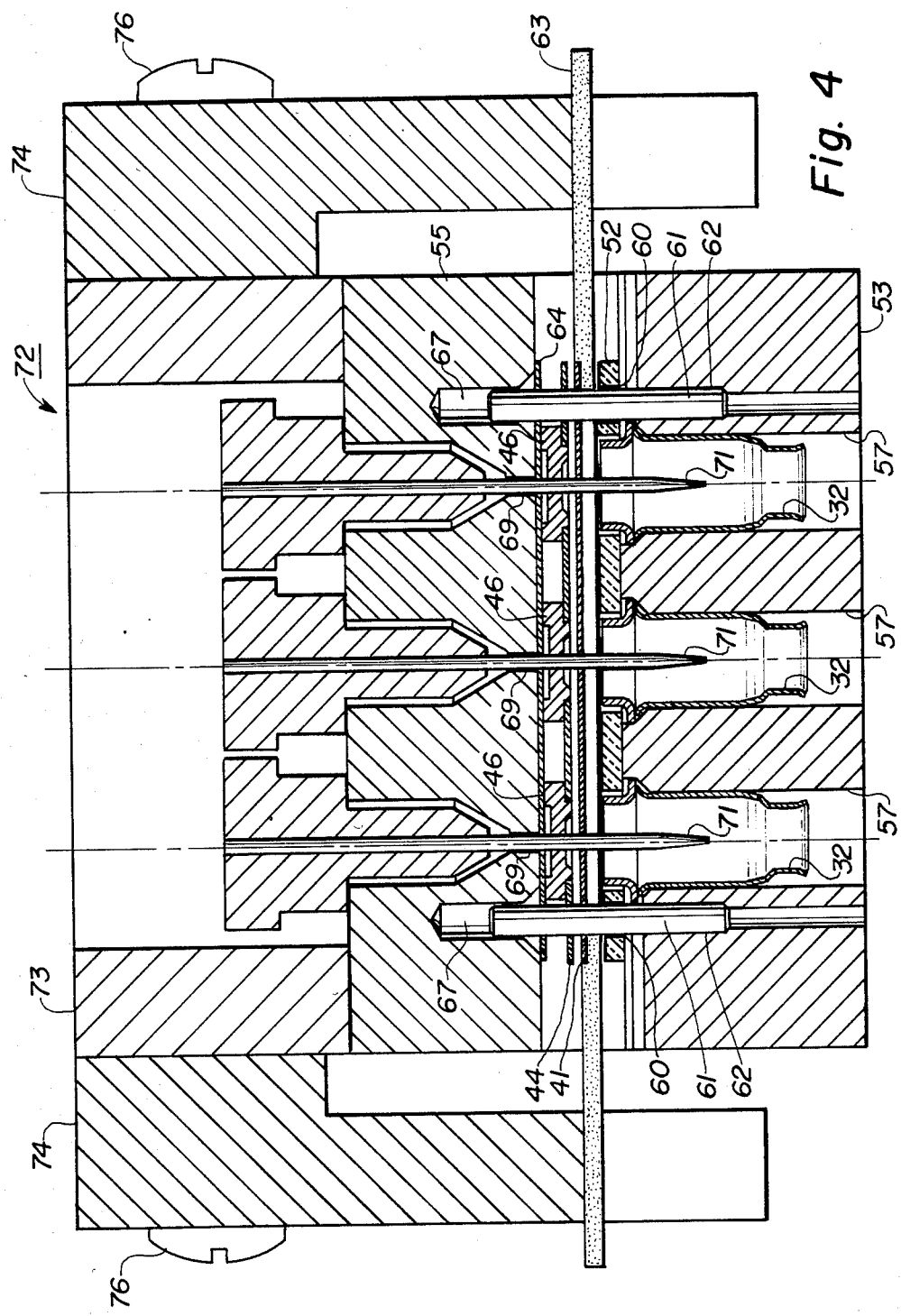
FIGS. 4 and 5 are front and side sectional elevational views of the subassembly shown in FIGS. 2 and 3 during its manufacture.

The novel gun 10 shown in FIG. 1 including the cathode-grid subassembly shown in FIGS. 2 and 3 is similar to the gun disclosed in my U.S. Pat. No. 4,298,818 except for the control grid electrode, the screen grid electrode and the method of fabricating the subassembly with these electrodes. The gun 10 comprises two glass support rods 12, also called beads, upon which various electrodes of the gun are mounted. These electrodes include three equally-spaced inline cathode assemblies 14, one for each beam, a control grid electrode 16, a screen grid electrode 18, a first accelerating-and-focusing electrode 20, a second accelerating-and-focusing electrode 22 and a shield cup 24 spaced from the cathode assemblies 14 in the other named.

The first accelerating-and-focusing electrode 20 comprises two rectangularly cup-shaped members 21 and 23 joined together at their open ends. The closed ends of each member 21 and 23 have three apertures each which are aligned with the apertures of the control and screen grid electrodes 16 and 18. The second accelerating-and-focusing electrode 22 is also rectangularly cup shaped with the open end of the electrode 22 facing away from the electrode 20. Three in-line apertures also are in the electrode 22. The middle aperture 25 (FIG. 1) is aligned with the adjacent middle aperture 27 in the first electrode 20. However, the two outer apertures (not shown) are slightly offset outwardly with respect to the outer apertures of the electrode 20 to aid in convergence of the outer beams with the center beam. The shield cup 24, located at the output of the gun 10, has various coma correction members 29 located on its base around or near the electron-beam paths.

Each cathode assembly 14 comprises a cathode sleeve 26 closed at the forward end by a cap 28 having an electron emissive coating 30 thereon. The cathode sleeves 26 are supported at their open ends within support tubes 32. Each cathode is indirectly heated by a heater coil 34 positioned within the sleeve 26. The heater coils 34 have legs 36 which are welded to heater straps 38 which in turn are welded to support studs 40 that are embedded in the glass rods 12. The control and screen grid electrodes 16 and 18 are two closely-spaced elements each having three aligned apertures about 0.025 mm (1.0 mil) diameter spaced about 6.5 mm (260 mils) on center centered with the cathode coatings 30. The structure for the control grid electrode 16 is a single flat metal first plate 41 having two parallel flanges 42 on opposite sides of three in-line beam-defining first apertures 43 and an electrical connection tab 37. The structure of the screen grid electrode 18 is a composite formed from four elements. One element is a flat metal second plate 44 having three substantially square windows 45 therein opposite the first apertures 43 and an electrical connection tab 39. The windows 45 are closed by three separate metal third plates 46. Each third plate 46 is essentially a flat plate except that the central portion is slightly bulged towards the first plate 41 and has a beam-defining second aperture 47 therein about 0.025 mm (1.0 mil) diameter, which is separately aligned with its associated first aperture 43 along a common axis 48. The second plate 44 has two parallel flanges 49 on opposite sides of the second apertures 47.

Figure 5:
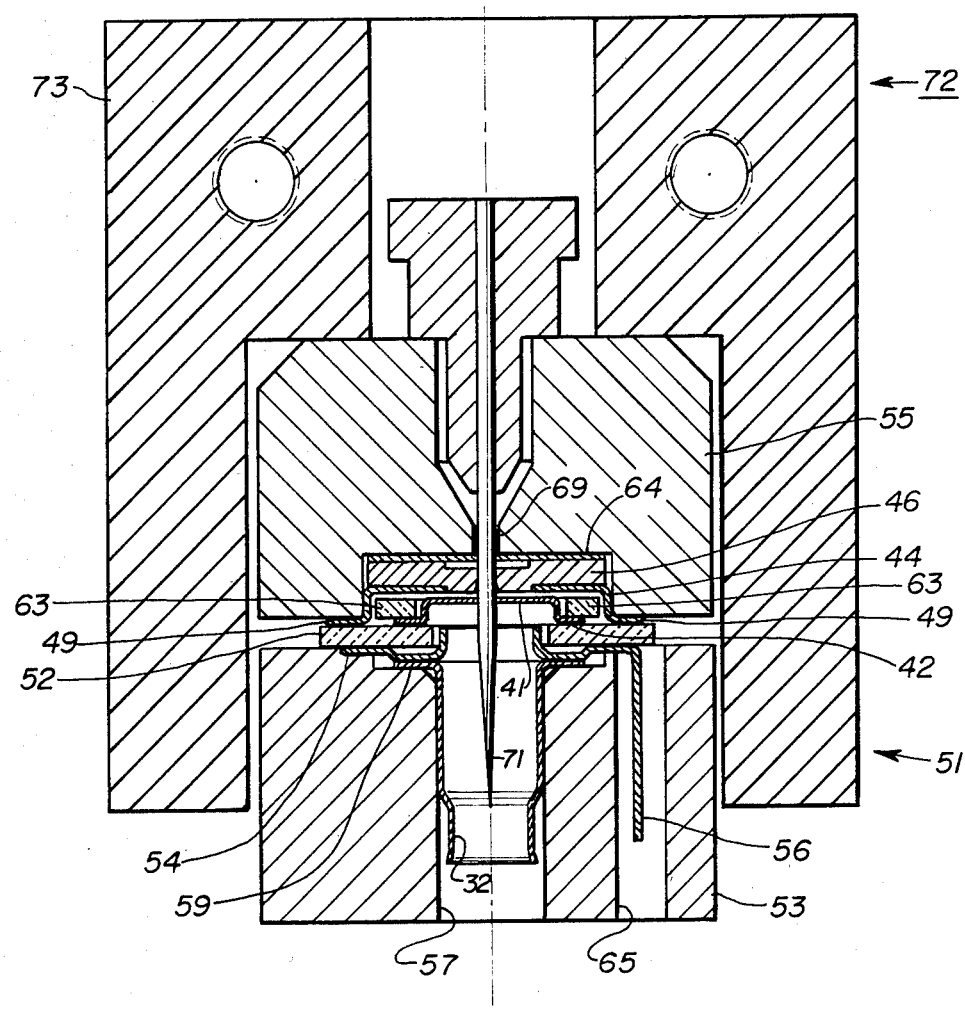

The cathode assembly 14, the control grid 16 and the screen grid 18 shown in FIGS. 2 and 3 are assembled and brazed into a unitary subassembly 50 in the jig 51 shown in FIGS. 4 and 5. The jig 51 comprises lower and upper jig members 53 and 55 respectively. Three flanged cathode support tubes 32 are positioned in three recesses 57 in the lower jig 53. Then, an annular member 54 is positioned on top of the flange 59 of each support tube 32. Each annular member 54 has an integral contact tab 56. Then, a single wafer-shaped flat ceramic piece 52 is positioned over the annular members 54. The ceramic piece 52 has a hole therethrough opposite each tube 12 and annular member 54, and a positioning hole 60 near the ends thereof. A positioning bar 61 fits through each positioning hole 60 into a corresponding lower positioning hole 62 in the lower jig member 53. The ceramic piece 52 has two opposed major surfaces which are metalized so that parts can be brazed thereto. Next, first plate 41 (the control grid 16) is positioned on the positioning bars 61 with its flanges 42 resting on one major surface of the ceramic piece 52. The tab 56 is housed in an oversized recess 65 in the lower jig member 53. Two flat ceramic strips 63 are placed on top of the control grid electrode 16, one on each side of the positioning bar 61. Next, the second plate 44 is positioned on the positioning bars 61 with its two parallel flanges 49 resting on the one major surface of the ceramic wafer 52. Then, the third plates 46 are roughly positioned on the second plate 44. An auxiliary alignment 64 having three alignment holes therein is laid over the third plates 46. The upper jig member 55 is positioned on the positioning bars 61 in upper positioning holes 67. The upper jig member 55 has three oversized alignment holes 69 therein opposite and centered on each tube 32. Three alignment pins 71 are passed through the alignment holes 69 in the upper jig member 55, through the beam-defining second apertures 47 in the third plates 46, through the beam-defining first apertures 43 in the first plate 41 and into the support tubes 32. A weight is positioned on top of the upper jig member 55. The weight 72 comprises three structural parts. A center weight 73 applies force on the second grid plate flanges 49 through the upper jig member 55. Two side weights 74 apply force on the two ceramic strips 63, which transmits that force to the flanges 42 of the first plate 41. The two side weights 74 are coupled to the center weight 72 by four screws 76 in such manner that the three parts are free to move vertically with respect to each other thereby applying independent forces on the first and second plate flanges 42 and 49. All of the contacting surfaces of the members of the subassembly 50 have brazing material thereon. The jig 51 with the members assembled therein as shown in FIGS. 4 and 5 is now heated to a suitable brazing temperature (about 1000° C.) for the required time interval and then cooled. The jig is disassembled, the unitary subassembly 50 is removed, and the spacer strips 63 are removed. The subassembly 50 shown in FIGS. 2 and 3 is now attached to the remainder of the gun by welding the metal second plate 44 of the screen grid electrode 18 to two support brackets 75 that are embedded in the beads 12 (FIG. 1).

It should be noted that the present invention centers around the construction and method of assembling an electrode having at least three beam-defining second apertures in separate plates, which apertures are separately aligned to a closely-spaced electrode comprising a single metal plate having three beam-defining first apertures therein in prescribed locations. Thus, each second aperture is aligned with respect to its associated first aperture independently of the size and spacing tolerances of any and all of the remaining apertures in both electrodes. The apertures may be in any location arrangement in addition to the in-line arrangement described in the example. The remainder of the gun may vary slightly or greatly from the above-described construction. Furthermore, the two electrodes may be held by a support other than the ceramic piece described above. Also, the beam-defining apertures may be aligned optically by passing a light beam through the first apertures in the single metal plate, positioning the second apertures where they can pass the light beam passed by the first apertures and then fixing the separate plates with respect to the single metal plate. Attaching and fixing the structural parts can be by brazing, welding or any other techniques for achieving this purpose.

What is claimed is:

1. In a multi-beam electrode gun comprising at least two spaced successive electrodes individually held in position from a common support, one of said electrodes comprising a single metal first plate having at least three electron-beam-defining first apertures therein, the improvement wherein said other electrode is a composite structure comprising (a) a single metal second plate having a window therein opposite each of said first apertures and (b) a plurality of separate metal third plates attached to said metal second plate, with one of said plurality of third plates closing each of said windows, each of said third plates having a single beam-defining second aperture therein separately aligned to one of said beam-defining first apertures.

2. The gun defined in claim 1 wherein said support is an electrically-insulating ceramic plate having opposed major surfaces, and said first and second plates are individually attached to the same one major surface of said ceramic plate.

3. The gun defined in claim 2 including a separate cathode assembly attached to the other major surface of said ceramic plate and aligned with each pair of first and second aligned apertures.

4. The gun defined in claim 1 wherein said first plate is the control grid electrode of said gun, and said third plate is the screen grid electrode of said gun.

* * * * *